United States Patent
Cerezo Sanchez

(10) Patent No.: US 10,423,806 B2
(45) Date of Patent: Sep. 24, 2019

(54) SECURE MULTIPARTY COMPUTATION ON SPREADSHEETS

(71) Applicant: David Cerezo Sanchez, Madrid (ES)

(72) Inventor: David Cerezo Sanchez, Madrid (ES)

(73) Assignee: Calctopia Limited, Cork (IE)

(*) Notice: Subject to any disclaimer, the term of this patent is extended or adjusted under 35 U.S.C. 154(b) by 200 days.

(21) Appl. No.: 15/525,138

(22) PCT Filed: Nov. 12, 2014

(86) PCT No.: PCT/IB2014/065970
§ 371 (c)(1),
(2) Date: May 8, 2017

(87) PCT Pub. No.: WO2016/075512
PCT Pub. Date: May 19, 2016

(65) Prior Publication Data
US 2018/0276417 A1    Sep. 27, 2018

(51) Int. Cl.
*G06F 21/72* (2013.01)
*G06F 8/41* (2018.01)
(Continued)

(52) U.S. Cl.
CPC .............. *G06F 21/72* (2013.01); *G06F 8/41* (2013.01); *G06F 8/443* (2013.01); *G06F 17/246* (2013.01);
(Continued)

(58) Field of Classification Search
CPC .......... G06F 8/41; G06F 17/246; G06F 21/74; G06F 21/72; G06F 7/483; G06F 8/443;
(Continued)

(56) References Cited

U.S. PATENT DOCUMENTS

| 2007/0233811 | A1* | 10/2007 | Rochelle | G06F 17/246 |
| | | | | 709/219 |
| 2009/0235087 | A1* | 9/2009 | Bird | G06F 21/10 |
| | | | | 713/190 |
| 2017/0199728 | A1* | 7/2017 | Woods | G06F 8/35 |

OTHER PUBLICATIONS

Zhang et al. "PICCO: A General-Purpose Compiler for Private Distributed Computation", published in Nov. 2013, pp. 813-826.*

* cited by examiner

*Primary Examiner* — Baotran N To

(57) ABSTRACT

Systems, computer-readable media and methods for enabling secure computation on spreadsheet software. A secure spreadsheet is implemented as an add-in to an existing spreadsheet program, or as a new spreadsheet program/web application, to allow secure computations on private input data (and also optionally with private functions) without the parties learning anything about them, via the familiar spreadsheet interface and its formula language. Automatic conversion of previous spreadsheet data and formulas is provided whenever possible, or assisted via a helper. The secure computation can be executed between the computers of the involved parties, or outsourced to a third-party—cloud computing system (FIG. 4)—: the secure cryptographic calculation module automatically optimizes for the best performing technique of secure computation (for example, homomorphic encryption, garbled circuits, oblivious transfers, secret sharing, oblivious random access machines and/or a combination of the previous crypto-primitives).

14 Claims, 5 Drawing Sheets

(51) Int. Cl.
*G06F 17/24* (2006.01)
*H04L 9/00* (2006.01)
*G06F 21/74* (2013.01)
*G06F 17/27* (2006.01)
*G06F 7/483* (2006.01)

(52) U.S. Cl.
CPC .......... *G06F 17/2705* (2013.01); *G06F 21/74* (2013.01); *H04L 9/008* (2013.01); *G06F 7/483* (2013.01); *H04L 2209/46* (2013.01); *H04L 2209/50* (2013.01)

(58) Field of Classification Search
CPC . G06F 17/2705; H04L 2209/46; H04L 9/008; H04L 2209/50
See application file for complete search history.

[Fig. 1]
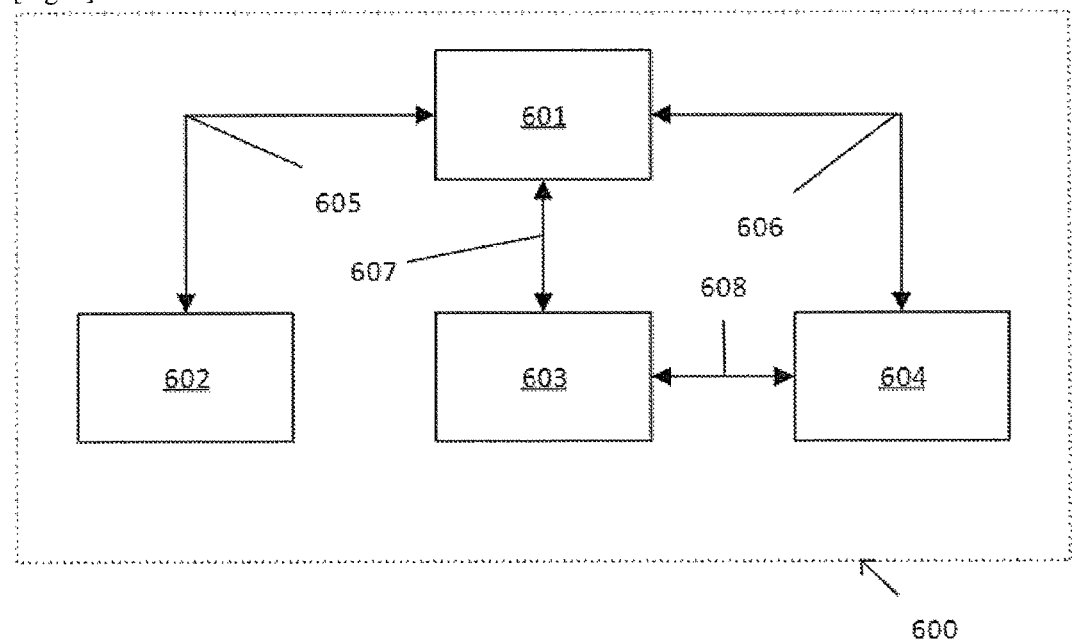
[Fig. 2]
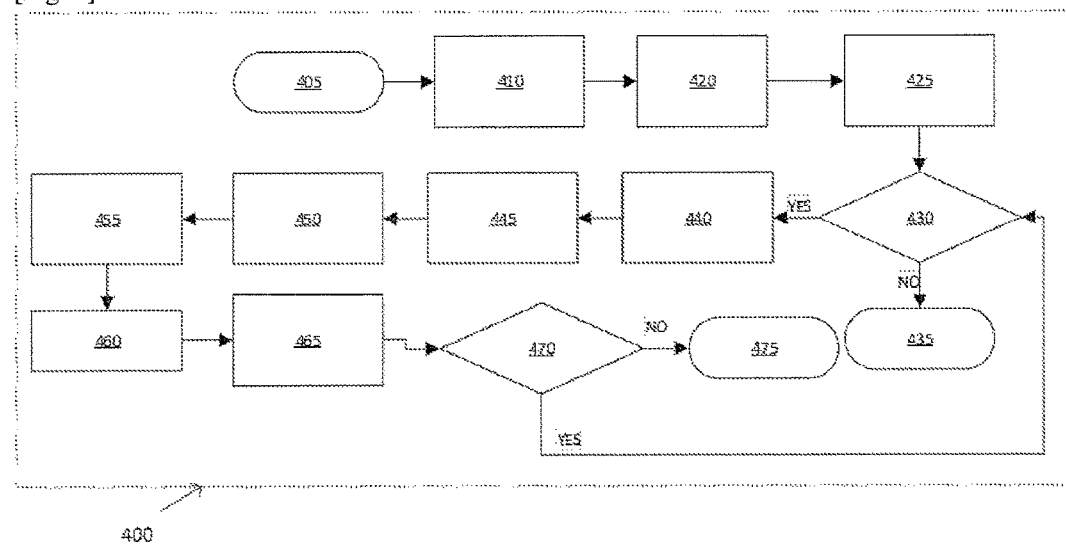

[Fig. 3]
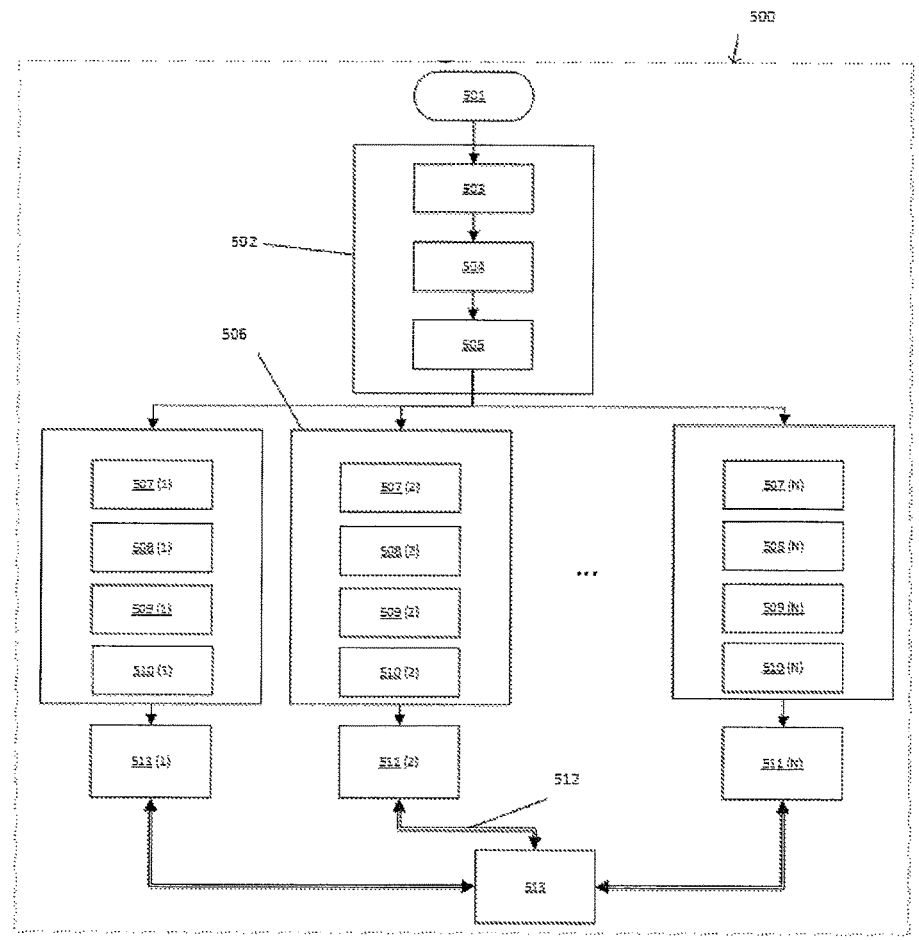
[Fig. 4]
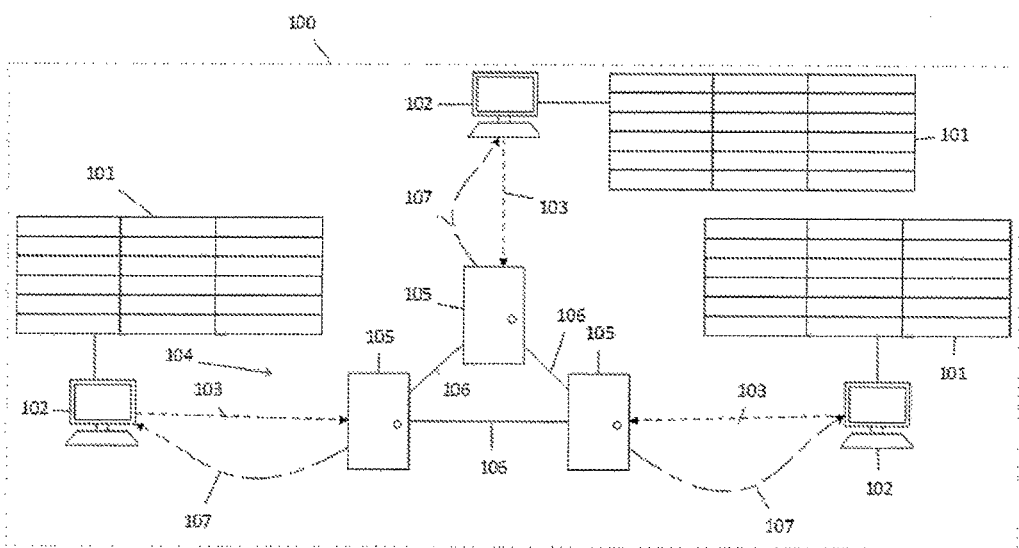

[Fig. 5]
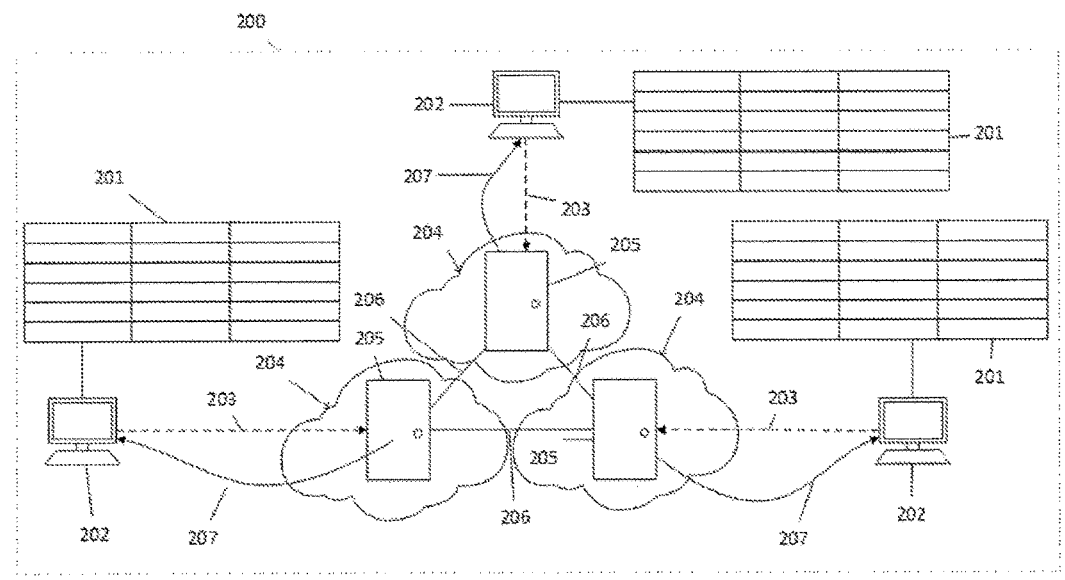
[Fig. 6]
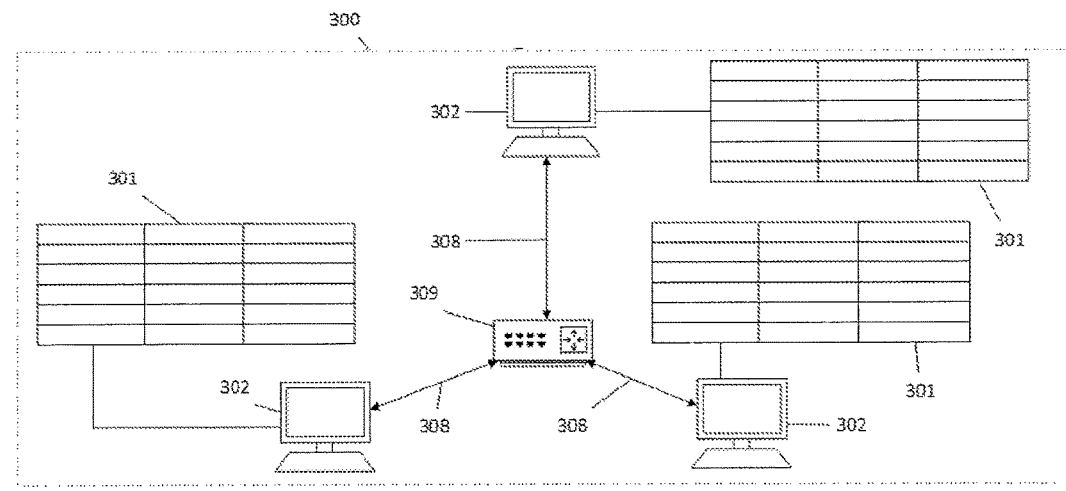

[Fig. 7]
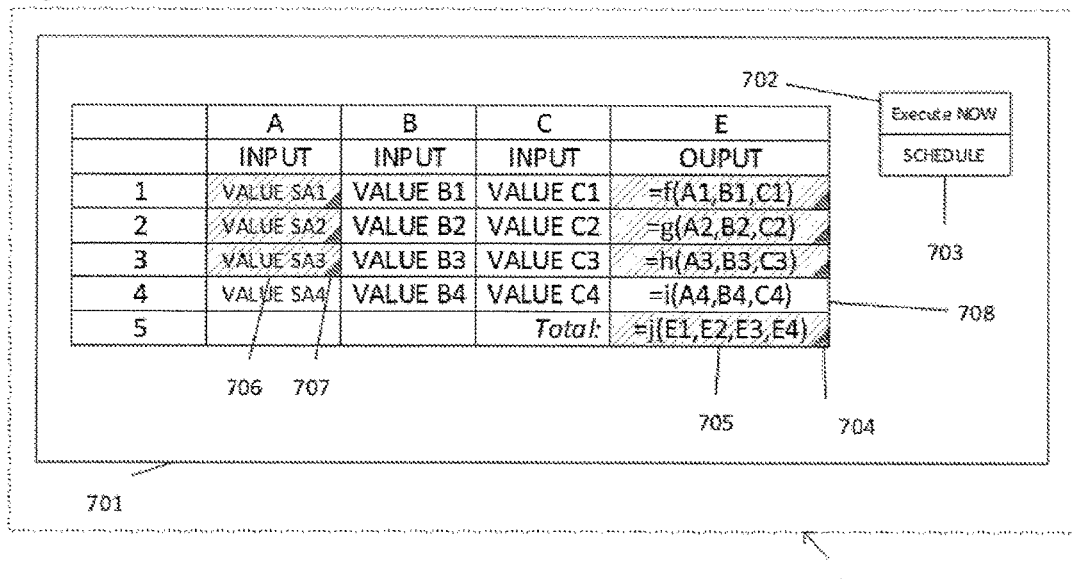
[Fig. 8]
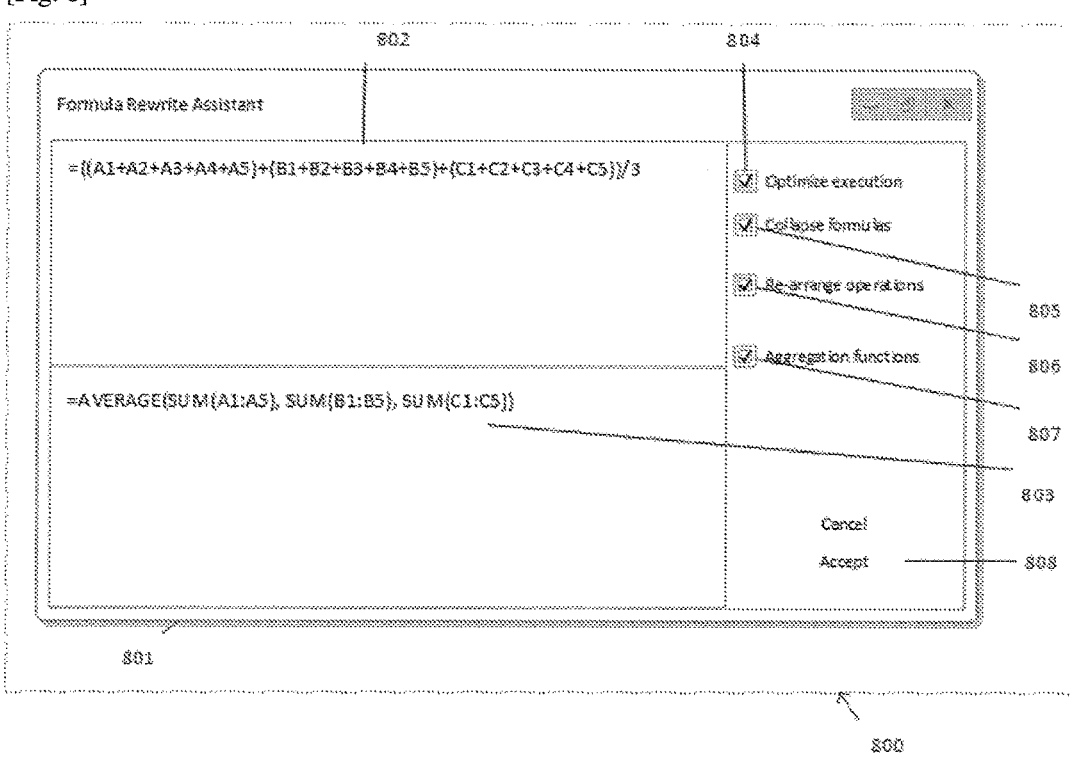

[Fig. 9]
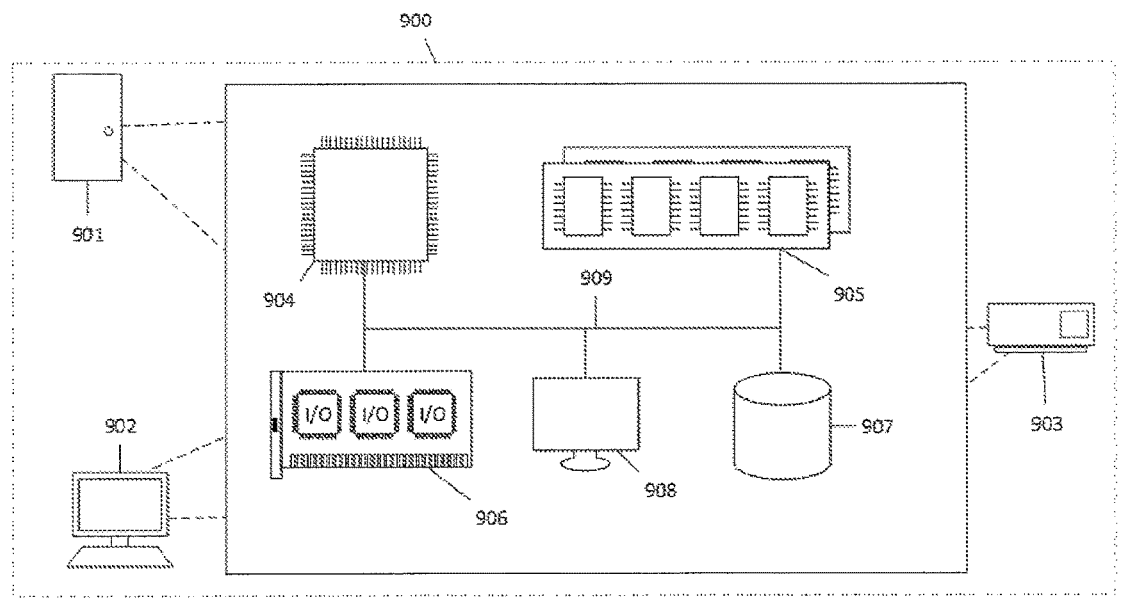

SECURE MULTIPARTY COMPUTATION ON SPREADSHEETS

TECHNICAL FIELD

Embodiments relate to spreadsheet calculation processing. More particularly, this disclosure is related to a user programmable secure spreadsheet system and a computer-readable medium and a computer implemented method configured to carry out secure multiparty computations.

BACKGROUND

The first computer spreadsheet program was introduced in 1979, allowing users to perform complex computations using an expressive but very easy to learn formula language in comparison to computer programming languages: for that reason, they remain the preferred calculation tool for non-computer scientists. Collaboration-enabled spreadsheets, allowing multiple users to collaborate simultaneously on a single spreadsheet document, show a latent need for collaborative calculation over data that is currently limited by the required free sharing of data, opening the possibility of loss and theft of very valuable information: to solve these problems, a secure spreadsheet that preserves and enhances the privacy and ownership of data is disclosed.

Multiple variations and models of secure multi-party protocols have been published in the cryptographic literature: security assumptions (computational vs unconditional), adversarial models (active vs passive, static vs adaptive), underlying cryptographic primitives (garbled circuits, oblivious transfers, secret sharing, homomorphic encryption, oblivious random access machines), communication models (secure channels, broadcast), and delegatable execution (outsourcing to the cloud, trusted hardware). It would be of great utility to abstract away all these models of secure computation, so that the user is able to configure different security parameters and security scenarios without impacting the support for secure computation of the formulas taken from spreadsheet software packages; more specifically, users should be able to outsource the computation to one or multiple cloud systems instead of using their own computers, with the aim of speeding up secure computations.

It is therefore an object of the present disclosure to provide various models of security computation under the graphical interface of the spreadsheet paradigm, allowing an easy, fast and convenient to securely calculate for the non-cryptographer.

DISCLOSURE OF INVENTION

Summary

The object is solved by a user programmable secure spreadsheet calculation system, a computer-readable medium and a computer implemented method of secure spreadsheet calculation according to the present claims.

The basic idea of the present disclosure is to provide a user programmable secure spreadsheet calculation system in which a parser module interprets values, variables and formulas obtained from a spreadsheet module, to generate a secure program using a secure computation protocol that when executed by a secure cryptographic calculation module, an encrypted result is computed so that users of the secure spreadsheet system learn nothing from the data of other users except the result of the calculation. The secure parser module and the secure cryptographic calculation module include various disclosed optimizations that are essential to provide fast executions of secure calculations, satisfying user's expectations based on the quick calculations carried out by spreadsheets in a non-secure way. In fact, spreadsheets reveal as a perfect field in which to apply secure computation techniques for the reason that calculations usually done by spreadsheets lack loops and recursion, these being more amenable to secure computation. This basic idea can be further extended to the benefit of users: to speed-up the secure calculations, the spreadsheet and the secure parser module could be present in a local computer and the secure cryptographic calculation module in a cloud computing system; and data could be taken from a publicly-accessible directory of third-party encrypted values, variables and formulas, which could be used for secure calculation after their purchase.

In the interest of clarity, several terms which follow are specifically defined for use herein. The term 'secure program' is used herein to refer to any program that comprises executable code and encrypted information, equivalent to at least some values, at least some variables and at least some formulas included within spreadsheet files.

The term 'spreadsheet file' is used herein to refer to refer to any electronic document in which user data is arranged in the rows and columns of a grid and can be manipulated and used in calculations. Spreadsheet files can be in solid-state memory (RAM), on computer storage medium or on a network-accessible storage device.

The term 'user data' is used herein to refer to any information contained within spreadsheet files, comprising: values, cell references, variables, functions and formulas.

The term 'secure computation protocol' is used herein to refer to any cryptographic protocol that allows computation on encrypted data, based on any privacy-preserving protocol or technique, comprising: garbled circuits and oblivious transfers; and secret sharing; and homomorphic encryption; and oblivious random access machines (ORAM); and combinations thereof. The terms 'secure multi-party computation' and 'secure computation' can be used interchangeably herein. The terms 'secure computation' and 'secure calculation' can be used interchangeably herein.

The term 'party' is used herein to refer to any entity executing the steps of a cryptographic protocol: a computer program running on a computer system operated by a human being, or a computer program running on a computer system acting by itself and without human control; blindly following the cryptographic protocol specification, or maliciously adhering to the specification; acting alone, or maliciously colluding with other parties.

The term 'cloud computing system' is used herein to refer to any collection of remote servers networked together to facilitate the sharing of their resources: the cloud computing system may be accessible by using a private network or the Internet; the cloud computing system could be open for public use (public cloud), or could be operated by a single organization (private cloud), or could be a composition or multiple clouds (hybrid cloud).

The term 'secure function evaluation' is used herein to refer to a property of the security model of some cryptographic protocols such that a set of mutually distrustful parties evaluate a function of their joint inputs without revealing their inputs to each other; additionally, the result of the evaluation of the function could not also be revealed to some parties. In more mathematical terms, p parties hold at least a input $x_i$ and they calculate a function $F(x_1, \ldots, x_p)$ using a cryptographic protocol such that at its completion, some or all parties know the result of $F(x_1, \ldots, x_p)$ but learns nothing more about $x_j$ when j does not equal i.

The term 'private function evaluation' is used herein to refer to a property of the security model of some cryptographic protocols such that a set of mutually distrustful parties evaluate a function of their joint inputs, said function only known to a party, without revealing their inputs to each other and without the other parties learning the function; additionally, the result of the evaluation of the function could not also be revealed to some parties. In more mathematical terms, p parties hold at least a input and they calculate a function $F(x_1, \ldots, x_p)$ which is known only to a party q, using a cryptographic protocol such that at its completion, some or all parties know the result of $F(x_1 \ldots, x_p)$ but learns nothing more about $x_j$ when j does not equal i and also nothing about function F( ) when j does not equal q.

The term 'and/or' is used herein to mean both 'and' as well as 'or'. For example, 'A and/or B' is construed to mean A, B or A and B.

By 'module' as a term is used herein, it may include hardware and/or software.

According to the present disclosure, a user programmable secure spreadsheet calculation system comprising: a spreadsheet module configured to process user data in one or more spreadsheet files, said user data comprising user values, user variables and/or user formulas; and a secure parser module configured to obtain said user data from said spreadsheet module and to generate a secure program with at least one secure computation protocol using the obtained user data so as to allow computation of at least one encrypted user spreadsheet result; and a secure cryptographic calculation module configured to receive said secure program from said secure parser module, and to compute said at least one encrypted user spreadsheet result by executing said secure program. According to this embodiment, one its main advantages is that spreadsheets are reinterpreted as secure programs that use secure computation protocols, whose encrypted results after their execution can be further reused in other secure calculations, or even stored without further processing. Another advantage is that the secure parser module interprets all the user data obtained from spreadsheets, providing retro-compatibility with already existing spreadsheet files and minimizing the need for changes. Yet another advantage resides in the novel generation of secure programs comprising secure computation protocols and using obtained user data from spreadsheets, and their computation done by a secure cryptographic calculation module: all these steps are heavily optimized for maximum speed and security as described herein, using an optimizing compiler and the automatic combination of the best techniques for secure computation, re-adjusted based on the profiling of current and previous executions.

According to another embodiment, said secure cryptographic calculation module is additionally configured to transmit the at least one encrypted user spreadsheet result to said secure parser module and said secure parser module is additionally configured to decrypt the received at least one encrypted user spreadsheet result and to provide said decrypted user spreadsheet result to said spreadsheet module. The main benefit of this embodiment is that the encrypted results of the secure calculations are transmitted back to users to be decrypted and displayed on their spreadsheet interfaces, or to update other variables and formulas which in turn may result in further secure calculations. The results from a secure calculation therefore may remain encrypted for use in other secure calculations or could be decrypted to be used as input to other secure calculations, but they are preferably displayed on the user's spreadsheet interface.

According to a further embodiment, the user programmable secure spreadsheet calculation system is implemented as an add-in to an existing spreadsheet computer program, said add-in comprising a secure parser module configured to interpret spreadsheet values, variables and/or formulas; or as an entirely new spreadsheet computer program; or as a web application. In an exemplary embodiment, the present disclosure is implemented as an add-in to Microsoft® Excel®: an important aspect are the many advantages resulting from reusing legacy spreadsheet files for secure computation with little to none modification. According to this embodiment, its main advantage is that to achieve retro-compatibility, full spreadsheet formulas and functions are supported, and not just a basic set of mathematical operations such as sum and multiplication.

According to a further embodiment, the spreadsheet module and the secure parser module are comprised in a local computing device and the secure cryptographic calculation module system is comprised in a remote computing device, connected with said local computing device. For example, the remote computing device could be a cloud computing system from a public provider, or one from a private provider. According to this embodiment, its main advantage is that secure computations can be outsourced to cloud computing systems to speedup complex calculations, delegating as much communication and computational costs as possible and without the cloud computing systems compromising the privacy of at least the inputs, outputs and/or the formulas, or combinations thereof. Multiple cloud computing systems could be used to perform a secure calculation, although preferably just one cloud computing system from a public provider is used to benefit from the lower network latency of collocated servers. According to this further embodiment, another advantage is that the computational power of cloud computing systems and the benefits of secure computation are transparently offered to the computer user through the easy to use interface of spreadsheet software, and without complex re-implementations. The data transmitted between the modules may be transmitted by any suitable way, but preferably over the Internet using secure communications channels such as SSL or VPNs.

According to a further embodiment, said secure computation protocol comprises at least one privacy-preserving protocol from a group of privacy-preserving protocols consisting of: garbled circuits and oblivious transfers, secret sharing, homomorphic encryption, and oblivious random access machines (ORAM), and combinations thereof. Details of the protocols and cryptographic techniques can be found in the papers cited herein and in the following books (Prabhakaran, Manoj M.; Sahai, Amit. 'Secure Multi-Party Computation'. IOS Press, 2013. ISBN 978-1-61499-168-7; Schneider, Thomas. 'Engineering Secure Two-Party Computation Protocols'. Springer, 2012. ISBN 978-3-642-30041-7; Hazay, Carmit; Lindell, Yehuda. 'Efficient Secure Two-Party Protocols'. Springer, 2010. ISBN 978-3-642-14302-1). The main benefit of this embodiment is the availability of multiple options for secure computation using different protocols and their different security models under the same interface. For example, garbled circuits and oblivious transfers may be used for secure computations between two parties, and secret sharing for 3 or more parties. And although homomorphic encryption could be used for securely computing any spreadsheet formula, it is preferably used as a tool to aid in speeding up steps of secure computation protocols: exemplarily, key generation and key sharing between multiple nodes. Regarding ORAMs, a particular suitable and therefore preferred usage is for secure computation within large arrays of encrypted data. Another advantage of this embodiment is that the secure parser module generates secure programs automatically optimized for the best performing protocol, or combinations of them, based on the interpretation done during the parsing phase. The user may choose one particular secure protocol and secure model of computation, but the default optimized secure program is the preferred choice. Yet another advantage of this embodiment is that the secure cryptographic calculation module automatically optimizes for the best performing parameters for secure computation based on current and previous executions. The user may override these automatically optimized parameters, but the preferred way to execute secure calculations is to use them.

According to a further embodiment, compiler optimizations methods are carried out during the spreadsheet formula parsing and code generation phases. Compiler optimization methods may comprise data flow and dependence analysis; and auto-parallelization; and auto-vectorization; and loop unrolling; and dead code elimination; and loop interchanging; and loop scheduling over cores; and improving locality of reference; and software sub-expression elimination; and constant folding and propagation; and code in-lining; and inter-procedural analysis and optimization; and combinations thereof. The main advantage of these optimizations is to generate code with the best performance, since secure computation of any function incurs in a penalty of various orders of magnitude. Details of the described compiler optimizations can be found in (Kennedy, Ken; Allen, John R. Optimizing compilers for modern architectures'. Morgan Kaufmann Publishers, 2002, ISBN 1-55860-286-0).

According to a further embodiment, optimizations for the compilation and execution of Secure Computation Programs are carried out during the spreadsheet formula parsing, code generation and execution phases. These optimizations may comprise: (1) calculating the topological order of secure programs to reorder their instructions in order to minimize their communication costs; (2) and inferring what is known from inputs and outputs by each party to maximize the computations done locally in a non-secure way instead of using secure computation protocols, since information known by all parties does not have to be computed securely and by logical inference algorithms it can be proven which program's values and/or variables are known by each party even before the program is executed; (3) and the automatic choice of the best performing protocols and cryptographic primitives during compilation, execution and Just-In-Time re-optimization. Better performance is obtained by exploiting the rich structure provided by the functions of every spreadsheet formula, and by profiling in real-time their execution for further optimizations.

According to a further embodiment, said secure cryptographic calculation module is further configured to obtain third-party values, variables and/or formulas from a directory of encrypted third-party values, variables and/or formulas and said secure cryptographic calculation module is configured to compute the at least one encrypted user spreadsheet result by executing the secure program using said third-party values, variables and/or formulas. The main advantage of this embodiment is the pre-availability of multiple sources of secret information (for example, but not limited to: prices, indices, financial ratios, genetic information, etc), which are valuable enough to justify the use of a secure spreadsheet system even when no other users are available and ready for secure computation. Another advantage of this embodiment is that encrypted third-party data may be accessible after its purchase, providing secure property rights for the effective commerce on information. For example, a user may buy access to a secret dataset of financial ratios to use it as input for its own secure calculations, without learning anything of said dataset.

According to a further embodiment, said secure cryptographic calculation module is configured for secure function evaluations or for private function evaluations. The main benefit according to this embodiment is that when using private function evaluations, formulas could also be protected: that is, a user of the system may own secret formulas only known to him, but allow others to compute with these formulas without these other users learning the formulas, and without the owner of the secret formulas learning the input data from the other users. And in combination with the previous embodiment, it allows for the effective selling of proprietary formulas without giving up their trade secrecy. For example, a user may buy just one secure calculation of a secret formula for credit scoring over its own data, learning just the result of the secure calculation and not the secret formula.

According to a further embodiment, the spreadsheet module is further configured to process said one or more spreadsheet files by at least one of following: a digital time-stamping module, and a digital signing module, and an indexer module of a public registry of digital files, and combinations thereof. The main advantage of this embodiment is to protect spreadsheet files shared between the users of the system and that could have been modified to adapt them to the disclosed secure spreadsheet system, so they can be authenticated and confirmed to come from the right users, preventing man-in-the-middle attacks and other compromises from outside of the system.

According to a further embodiment, the system further comprises: a catalogue module of secure functions configured to obtain secure programs associated with functions that are configured to generate results based on one or more user data associated with at least one of or more of a secure searcher; a secure indexer; a secure exchange; a secure auction; a secure settlement system; a secure clearing house; a secure transaction system; a secure matching market; a secure combinatorial optimizer; and combinations thereof. The main advantage of this embodiment is that the spreadsheet functions from commercial spreadsheet software packages are extended with a predefined set of functions of very advantageous nature. These functions may be used to interact with encrypted data within cloud computing systems to check, pool and update market data information.

According to a further embodiment, the system further comprises a key generation and distribution module, for generating at least one set of public and private keys and distributing said keys to at least one of the modules of the system. According to a further embodiment, techniques for using encrypted data under different public/private keys are implemented: proxy re-encryption, for reusing encrypted data under different public/private keys; and secure key generation and distribution, for creating shared public/private keys; and multi-key fully homomorphic encryption to evaluate any circuit on encrypted data that might be encrypted under different public keys. The main benefit of these embodiments is that the generation and distribution of the keys, a critical part of the security of every system, is carried out in a manner as transparent as possible to the user. Exemplary, a user joining a secure computation group for secure calculation is transparently provided with all the keys for all the secure computation protocols that may be used.

According to a further embodiment, the system further comprises an accelerator module to speed-up the secure cryptographic calculation module; and a ciphering module to increase the security of the secure cryptographic calculation module. The main advantage of this embodiment is the use of specialized hardware for cryptography and secure computation, locally or in a cloud computing system, so that users can be benefit from speedups and better security. Preferably, the secure cryptographic calculation module operates without said accelerator module or ciphering module and no further dedicated module is needed in the secure spreadsheet system, advantageously reducing the complexity and cost of the system, although these additional modules could be of great utility in both local and cloud systems. Exemplary, specialized hardware is designed for secure computation and built for both the local and cloud settings, providing speedups of various orders of magnitude.

According to a further embodiment, the system further comprising an interactive assistant module to suggest re-arrangements of the formulas to the user. The main benefit of this embodiment being that the user is assisted in choosing the best performing formulas and rewriting them in case they weren't fit for secure computation, for example, when they feature a function that can't be securely computed. Preferably, the user accepts all the modifications that the interactive assistant module proposes without the need of further changes According to a further embodiment, the secure parser module is further more configured to interpret multidimensional expression languages and data analysis expressions. According to this embodiment, its main advantage is that languages closely related but different from spreadsheet formulas are also supported: MultiDimensional eXpressions (MDX) is a calculation language similar to spreadsheet formulas used to query OLAP databases; and Data Analysis eXpressions (DAX) is a language for querying and calculating multidimensional models.

According to a further embodiment, a computer-readable medium including contents stored thereon which, when executed by the one or more computers, cause the one or more computers to perform secure spreadsheet calculations, comprising acquiring user data from a spreadsheet module, and parsing to interpret said acquired user data, and generating a secure program with at least one secure computation protocol using the acquired user data so as to allow computation of at least one encrypted user spreadsheet result, and transmitting said secure program, and receiving said secure program, and computing said at least one encrypted user spreadsheet result by executing said secure program.

According to a further embodiment, a computer implemented method of secure spreadsheet calculation comprising acquiring user data from a spreadsheet module, and parsing to interpret said acquired user data, and generating a secure program with at least one secure computation protocol using the obtained user data so as to allow computation of at least one encrypted user spreadsheet result, and transmitting said secure program, and receiving said secure program, and computing said at least one encrypted user spreadsheet result by executing said secure program.

According to a further embodiment, a secure parser module for use in a user programmable secure spreadsheet calculation system configured to obtain user data comprising user values, user variables and/or user formulas from a spreadsheet module, and to generate a secure program with at least one secure computation protocol using the obtained user data so as to allow computation of at least one encrypted user spreadsheet result by a secure cryptographic calculation module. As disclosed herein, the secure parser module is, by itself, of enough advantage to be considered standalone: exemplarily, multiple user programmable secure spreadsheet calculation systems could share one secure parser module located in a cloud computing system or locally accessible over a local area network, to prevent said systems from generating a secure program multiple times and benefit from better performance.

According to a further embodiment, a secure cryptographic calculation module for use in a user programmable secure spreadsheet calculation system configured to receive a secure program from a secure parser module, and to compute at least one encrypted user spreadsheet result by executing said secure program. As disclosed herein, the secure cryptographic calculation module is, by itself, of enough advantage to be considered standalone: exemplarily, multiple user programmable secure spreadsheet calculation systems could share one secure cryptographic calculation module located in a cloud computing system or locally accessible over a local area network, to speed-up secure calculations by centralizing at least a fraction of the execution of a secure computation protocol and benefit from better performance.

The present disclosure has been summarily described in the preceding paragraphs: it relates to spreadsheet calculation, and in particular it relates to a system and a method and a computer-readable medium for secure computation on spreadsheet files, enabling the secure computation of spreadsheet formulas without disclosing input data and optionally the resulting outputs; the privacy of the formulas may optionally be guaranteed. Secure computation over private data enables parties to calculate and mine datasets preserving the privacy of their data, providing secure property rights for data and formulas. In the present disclosure, these advanced data processing features are incorporated onto spreadsheet software packages to leverage current investments on spreadsheet files and technologies: in this regard, it improves the state of the art of spreadsheet technologies since the secure computation of arbitrary spreadsheet formulas have never been carried out, and they will be of great utility for financial calculations or genetic data, among other likely usages. And regarding the field of secure multi-party computation, the present disclosure improves the current state of the art by offering the automatic combination of the largest number of crypto-primitives for secure multi-party computation in a user-friendly interface. Other methods, systems, modules, media, and/or computer program products according to embodiments of the present disclosure will be or become apparent to one with skill in the art upon review of the following drawings and detailed description. It is intended that all such additional systems, modules, methods, media and/or computer program products be included within this description, be within the scope of the present disclosure, and be protected by the accompanying claims.

BRIEF DESCRIPTION OF DRAWINGS

Description of Drawings

The above and other objects, features and advantages of the present disclosure will become apparent from the following description of embodiments, in which:

FIG. 1. is a schematic diagram illustrating a secure spreadsheet calculation system in accordance to the present disclosure, with the additional modules of a key generation and distribution module and a secure parser module remotely connected to a public directory of encrypted values, variables and/or formulas.

FIG. 2. is a flowchart illustrating a first exemplary execution flowchart of the modules of the present disclosure, focused on a sequential description of the interactions of the modules.

FIG. 3. is a flowchart illustrating a second exemplary execution flowchart of the system of the present disclosure, focused on its cryptographic aspects.

FIG. 4. is a schematic diagram illustrating a secure spreadsheet calculation system in accordance to the present disclosure, in which secure computations are outsourced to be executed within just one cloud computing system.

FIG. 5. is a schematic diagram illustrating a secure spreadsheet calculation system in accordance to the present disclosure, in which secure computations are outsourced to be executed within multiple cloud computing systems.

FIG. 6. is a schematic diagram illustrating a secure spreadsheet calculation system in accordance to the present disclosure, in which secure computations are executed between client computers and without using an external cloud computing system.

FIG. 7. is a GUI diagram illustrating how secured data and formulas are differentiated in a spreadsheet from normal ones in accordance with an aspect of the present disclosure.

FIG. 8. is a GUI diagram illustrating a formula rewriting assistant that guides the user in writing proper secure formulas in accordance with an aspect of the present disclosure.

FIG. 9. is a schematic diagram illustrating the different modules of a secure spreadsheet calculation system in accordance to the present disclosure.

DISCLOSURE OF INVENTION

Detailed Description of the Embodiments

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies. Although the present disclosure as described below references examples in which secure calculations are done between three parties and three servers, the principle applies to two or more number of parties and two or more number of computation servers.

The following FIGS. 1-3 provide a protocol-level perspective of the present disclosure; FIGS. 4-6 provide a systems-level perspective of the present disclosure; FIGS. 7-8 describe the user interface of the present disclosure; FIG. 9 provides an exemplary instantiation on a computer system.

FIG. 1 illustrates a schematic diagram illustrating a secure spreadsheet calculation system in accordance to the present disclosure. The system 600 comprises a spreadsheet module and a secure parser module 601 in direct connection or remotely connected 607 to a secure cryptographic calculation module 603, said secure parser module remotely connected 605 to a key generation and distribution module 602, and said secure parser module remotely connected 606 to a publicly accessible directory of encrypted values, variables or formulas 604. The spreadsheet module 601 holds the ordinary user interface of a spreadsheet application, as described in the next figures, extended with the secure computation functionality mentioned in the previous figures. The key generation and distribution module 602 generates and distributes public and private keys to the participating spreadsheet modules and secure parser modules 601: it could serve as a generator and storage of public keys typical of traditional PKI infrastructures, or it conjointly generates public-private key pairs between itself and a client or between itself or multiple clients by using a secure computation protocol. The publicly accessible directory 604 contains a public and hierarchical directory of secret datasets, lists of encrypted values, variables and/or formulas, as if they were taken from the spreadsheets of the users of other computation groups, as sources of data to securely compute on them, and available to spreadsheet modules and secure parser modules 601 and said publicly accessible directory also directly or remotely connected 608 to secure cryptographic calculation modules 603: these datasets may contain datasets from multiple industries (finance, biomedical and earth sciences research, . . . ) and may be offered for free or for payment. Furthermore, formulas can also be part of said public and hierarchical directory: the usefulness of this particular feature is evident with the secure cryptographic calculation module configured for private function evaluations, enabling the effective selling of proprietary formulas without revealing their exact nature and structure.

Included herein is a set of flow charts representative of exemplary methodologies for performing novel aspects of the disclosed system. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 2 illustrates a first exemplary execution flowchart of the modules of the present disclosure, focused on a sequential description of the interactions of the modules. At 405, the program implementing a secure spreadsheet is loaded, which could exist in various types (as a secure parser loaded into the secure spreadsheet application by means of its 'add-in' extensibility functionality; as a standalone secure spreadsheet application; as a web application, among others). At 410, each party gets connected to a secure computation group; groups may exist in a local network or available on cloud computing systems, and the user is able to configure the group that he wants to join to. At 420, users load a workbook in the spreadsheet application with values, variables and/or formulas revised to be compatible with the present disclosure: if a formula has not yet been revised, a 'Formula Rewrite Assistant' module may be used, as described in more detail below in FIG. 8. At 425, at least one user requests the execution of a secure calculation. At 430, it's checked whether the involved values, variables, cells, fields and/or formulas in the calculation have been designated to be processed in a secure way: in the negative case, a formula evaluation without any secure computation facility is carried out at 435. In the positive case, at 440 a parser module interprets all the involved formulas, values and/or variables to generate secure programs that implement secure computation protocols equivalent to the involved formulas, values and/or variables, optimized for the selected security models and environment of execution (as described in more detail below in the exemplary flowchart of FIG. 3). At 445, the involved values, variables, cells and/or formulas are encrypted with the required keys according to the selected protocols, in such a way that only each user is able to decrypt their own. At 450, the secure cryptographic calculation module runs the generated secure programs and the secure computation protocols they specify (as described in more detail in the exemplary protocols below): this may be preceded by sending the data generated at 445 to an external secure cryptographic calculation module that resides in an external cloud computing system. At 455, the secure cryptographic calculation module reaches the end of the secure computation protocol as specified by the generated secure programs: at 460, the encrypted results from the execution of the secure computation protocols are returned to the clients, which may require transmitting the encrypted results from the cloud computing systems through communications channels (among others: Internet, a private network or a VPN). At 465, the parser module at the clients decrypt their results and update whatever cells or variables are affected by them, possibly showing the results on the screen: as a collateral effect of updating cells, the returned data may also produce the start of more secure computations, restarting at 470 the described execution loop to 430. Otherwise, at 475 the end of the execution is reached.

The secure parser module according to the present disclosure is configured to carry out the following steps: as spreadsheet formulas can exist in multiple languages and the complete set of functions may be unknown as they vary from version to version, no unambiguous Backus-Naur Form grammar could be constructed. As a substitute, a state and stack-based tokenizer is used to obtain a tokenized representation of the formulas in Reverse Polish Notation. Then, the shunting-yard algorithm is used to get an Abstract Syntax Tree (AST) of the formulas; these abstract syntax trees are inspected to find references to other cells and formulas, and the process is repeated until a complete representation of formulas and cells involved in a calculation is obtained.

A first batch of optimizations is applied to the generated ASTs (exemplarily, expression simplification, dead-code removal and logical inferences) to prevent from secure computing formulas that could be calculated locally in a secure way (as described in more detail below in FIG. 3). Then, a plurality of expression rewriting rules is used to process and optimize the ASTs, the rewritten ASTs being semantically equivalent to the original ones but with better expected overall performance. Said rewriting rules include rules that calculate complexity-measures of the ASTs to determine the complexity of the expressions represented by an AST and the complexity of the rewritten expressions represented by an AST: said complexity measure is estimated in multiple dimensions (CPU cycles, memory, network rounds and network bandwidth) and considering several secure implementations varying on the secure computation protocol used for implementing a given functionality. Accordingly, some implementations of the present disclosure feature tables of the complexity measure of spreadsheet functions: that is, for each spreadsheet function there are estimations of the complexity to calculate said spreadsheet function for multiple secure computation protocols, multiple dimensions (CPU cycles, memory, network rounds and network bandwidth) and multiple parameters (number of parties p, length of bits n of the operands, number of entries e involved). In some implementations, the measure of complexity of a spreadsheet function is given by performing a traversal over the nodes of an AST to determine an estimation of the complexity to securely calculate said function. In case there aren't default settings predetermining the secure computation protocol to use, multiple implementations for secure computation will be considered when applying the plurality of expression rewriting rules. In some implementations, computations are carried out by the secure parser module to determine the best expression rewriting rules to be applied to the ASTs: in some examples, nodes are visited in a breadth-first fashion to determine the best rewriting rule that could be applied. It is the case that optimizing with an expression rewriting rule could be estimated to be the best local optima, but not a global optima: consequently, multiple tree traversals are carried out to deduce the best expression rewriting rules to be applied.

Next, taking as input the ASTs, code is emitted with calls to the methods and objects of the libraries available for secure computation (as described in more detail below in FIG. 3): the generation and compilation of secure programs from the formulas, values and/or variables contained within spreadsheets is done by an optimizing trial-mandate compiler configured to maximize computation performance, minimize communication costs and enhance the security of the calculations, as explained herein. The user is able to modify these tradeoffs by changing the parameters of the secure cryptographic calculation module before running any secure program.

In some examples, a secure program is executed by all parties of a secure calculation: said secure program contains all the instructions to be executed and all the parties know the functionality of the secure program in advance. In some examples, a secure program may contain a set of instructions only known to a party or a set of parties and no party knows all the functionality in advance. Said lack of full knowledge of the functionality of a secure program may not necessarily impact the security of said secure program and may be necessary to implement functionality specific to a party, such as sending and receiving and decrypting an encrypted result only intended to said party.

Additionally, the secure parser module could be configured to interpret other computer languages different from spreadsheet formulas: Multidimensional Expressions (MDX), a query language for OLAP databases as described by the 'Multidimensional Expressions Reference' available at the Microsoft's online Developer Network; and Data Analysis Expressions (DAX), a formula and query language as described by the 'Data Analysis Expressions Reference' available at the Microsoft's online Developer Network; and other computer languages of similar purposes.

The secure cryptographic calculation module according to the present disclosure is configured to securely compute using generalized Secure Multi-Party Computation techniques (SMPC), abstracting away multiple cryptographic protocols, primitives and techniques to provide the most efficient methods of secure computation for each function/formula and execution environment. Further details of these cryptographic protocols, primitives and techniques appear in the following publications, the contents of which are incorporated herein by way of reference:

In some examples, Oblivious Transfer (OT) is a secure computation protocol between a sender and a receiver, complete for secure computation: in a secure OT protocol the sender has n messages and the receiver has an index i, said receiver wishing to receive the i-th among the sender's messages without the sender learning index i and the receiver learning nothing about the other messages. Details for their efficient implementation can be found in (Asharov, Gilad; Lindell, Yehuda; Schneider, Thomas; Zohner, Michael. 'More efficient oblivious transfer and extensions for faster secure computation'. Proceedings of the 2013 ACM SIGSAC Conference on Computer & Communications Security, Pages 535-548).

In some examples, secret sharing refers to methods for distributing a secret amongst a group of parties, each of whom is allocated a share of the secret: the secret can be reconstructed only when a sufficient number of shares are combined together. More formally, [x] denotes the secret-shared value $x \in F_q$ parties among $p_1, \ldots, p_\beta$ such that any $\lceil (\beta+1)/2 \rceil$ of those can recover the secret. Regarding basic operations, [x]+[y], [x]+c and c[x] can be computed locally by each party $p_i$ using her shares of x and y while the computation [x][y] is mandatorily interactive for $\lceil (\beta+1)/2 \rceil$ parties. Details for the currently most efficient implementation of protocols based on secret sharing, optimized with shared MACs and a preprocessing offline phase that interchanges random data between the parties, can be found in (Damgard, Ivan; Keller, Marcel; Larraia, Enrique; Miles, Christian; Smart, Nigel. 'Implementing AES via an actively/covertly secure dishonest-majority MPC protocol' SCN 2012, volume 7485 of LNCS 7485, pages 241-263; Damgard, Ivan; Keller, Marcel; Larraia, Enrique; Pastro, Valerio; Scholl, Peter; Smart, Nigel. 'Practical Covertly Secure MPC for Dishonest Majority or: Breaking the SPDZ Limits' ESORICS 2013, pp. 1-18; Damgard, Ivan; Pastro, Valerio; Smart, Nigel; Zakarias, Sarah. 'Multiparty computation from Somewhat Homomorphic Encryption' CRYPTO 2012, LNCS 7417, pp. 643-662; Keller, Marcel; Scholl, Peter; Smart, Nigel. 'An architecture for practical actively secure MPC with dishonest majority' Computer & Communications Security 2013, pp. 549-560). The systems disclosed herein enables the delegation of secure computations to servers in the cloud that may be GPU-enabled and interconnected with high-performance communication channels with RDMA, currently the fastest way to reduce the communication overhead of secret sharing schemes.

In some examples, garbled circuits allow at least two parties with inputs x and y, respectively, to evaluate a pre-agreed arbitrary function $f(x,y)$ without leaking any information about their inputs beyond what is implied by the function output. One party, acting as circuit generator, generates an encrypted version of a Boolean circuit computing $f$ by generating a collection of garbled gates forming said garbled circuit, said garbled gates generated by associating two random cryptographic keys with each wire i of the circuit, $w_i^0$ encoding a 0-bit and $w_i^1$ encoding a 1-bit, then for each gate g of the circuit with input wires i, j and output wire k, the generator creates a garbled gate computing $$Enc^k_{w_i^{b_i}, w_j^{b_j}}\left(w_k^{g(b_i, b_j)}\right)$$

for all inputs $b_i, b_j \in \{0/1\}$; the second party, acting as circuit evaluator, obliviously computes the output of the circuit without learning any intermediate values by receiving from the generator the keys for the generator's inputs and obtaining the input-wire keys for the evaluator's input by oblivious transfer, so then given one key for each input wire of the circuit the evaluator can compute a key for each output wire of the circuit by decrypting the appropriate encrypted data given keys $w_i, w_j$ associated with both input wires i,j of garbled gates and obtaining the actual output of $f$ using the mapping from output-wire keys to bits. In some examples, garbled circuits are combined with secret shares so that each input and output function result must be a secret share; then, garbled circuits representing a function $f$ can be extended using an additional input r by the circuit generator to use it as a secret-shared return value of the non-extended function $f$, which could be further used for homomorphic encryption. Details for their efficient implementation can be found in (Kreuter, Benjamin; Shelat, Abhi; Shen, Chih-Hao. 'Towards billion-gate secure computation with malicious adversaries'. USENIX Security Symposium—2012, pages 285-300, 2012).

In some examples, homomorphic encryption refers to methods of encryption allowing computations to be carried out on encrypted data. More formally, with $c = E_{A_{pk}}(x)$ denoting the encryption of x under the public key of party A producing encrypted data c and $D_{A_{sk}}(c)$ denoting the decryption of said encrypted data c, when using a fully homomorphic encryption schemes the following relationships hold: $D_{A_{sk}}(E_{A_{pk}}(x) + E_{A_{pk}}(y)) = x + y$ for the sum operation and $D_{A_{sk}}(E_{A_{pk}}(x) \cdot E_{A_{pk}}(y)) = x \cdot y$ for the multiplication operation; non-fully homomorphic encryption schemes refer to the case when just one of the two previous relationships hold. In some examples, homomorphic encryption can be extended with secret sharing: at least a variable can be secret shared between the parties of a cryptographic protocol using homomorphic encryption. Before the advent of Fully Homomorphic Encryption, practical systems using non-fully homomorphic encryption were of no utility: in (Fouque, Pierre-Alain; Stern, Jacques; Wackers, Geert-Jan. 'CryptoComputing with rationals', Proceedings of the 6$^{th}$ International Conference on Financial Cryptography, pp 136-146, 2002), the addition of two rational numbers was not possible and the multiplication can only be done to a known integer. The immediate consequences of these limitations were that only the sum and product operations could be considered because more complex functions could not be undertook, excluding the hundreds of functions that are also part of spreadsheet software; moreover, multi-party computation was not even considered. After the introduction of Fully Homomorphic Encryption, it became possible to compute general functions but with performance some orders of magnitude slower than those achieved by the state of the art of secret sharing schemes or garbled circuits, although still being more efficient on a round complexity perspective: details for their efficient implementation and their tradeoffs with other schemes can be found in (S. Myers, M. Sergi, and Abhi Shelat. 'Threshold fully homomorphic encryption and secure computation'IACR Cryptology ePrint Archive, 2011: 454, 2011; Gentry, Craig; Halevi, Shai; Smart, Nigel. 'Fully homomorphic encryption with polylog overhead'. EUROCRYPT 2012, LNCS 7237, pp. 465-482; Asharov, Gilad; Jain, Abshishek; Lopez-Alt, Adriana; Tromer, Eran; Vaikuntanathan, Vinod; Wichs, Daniel. 'Multiparty computation with low communication, computation and interaction via threshold FHE'.

EUROCRYPT 2012, LCNS 7237, pages 483-501; Choudhary, Ashish; Loftus, J. Orsini, Emmanuela; Patra, Arpita; Smart, Nigel. 'Between a Rock and a Hard Place: Interpolating Between MPC and FHE', Advances in Cryptology—ASIACRYPT 2013, LNCS 8270, pp. 221-240).

In some examples, Oblivious Random Access Machines refers to methods of hiding access patterns to a server storing encrypted information. More formally, input y of the client is a sequence of data items denoted by $((v_1, x_1), \ldots, (v_n, x_n))$, and a sequence of read operations to retrieve the data of the item indexed at a position and write operations to set the value of an index position; the access pattern $A(y)$ is the sequence of accesses to the server storage system, containing both the indices accessed in the system and the data items read or written; an oblivious RAM system is considered secure if for any two inputs y,y' of the client, of equal length, the access patterns $A(y)$ and $A(y')$ are computationally indistinguishable for anyone but the client. In some implementations of ORAMs, techniques are used such as oblivious sorting algorithms and cuckoo hashing to map each item to two potential entries of a hash table. ORAMs exhibit significant speed-ups in comparison to the shortcomings of the circuit approach for Secure Computation because there are functions that are less efficient when implemented as a circuit of possibly very wide breadth and depth, as in the case of accessing an array for just one position, which has constant complexity in the ORAM model but linear complexity inherent in the circuit model. Details for the currently most efficient implementations based on ORAMs appear in (Gentry, Craig; Goldman, Kenny A.; Halevi, Shai; Jutla, Charanjit S.; Raykova, Mariana; Wichs, Daniel. 'Optimizing ORAM and Using It Efficiently for Secure Computation'. Privacy Enhancing Technologies 2013, pp. 1-18; Shaun Wang, Xiao; Chan, T.-H. Hubert; Shi, Elaine. 'Circuit ORAM: On Tightness of the Goldreich-Ostrovsky Lower Bound'. Cryptology ePrint Archive: Report 2014/672).

Private Function Evaluation: for boolean circuits, the relaxation of the privacy model of Semi-Private Functions may be used, in which the boolean circuit's topology is revealed to the evaluator but not the functionality of the gates, as detailed in (Paus, Annika; Sadeghi, Ahmad-Reza; Schneider, Thomas. 'Practical Secure Evaluation of Semi-Private Functions'. Applied Cryptography and Network Security 2009. LNCS 5536, pp. 89-106). For arithmetic circuits, details for their most currently efficient implementation can be found in (Mohassel, Payman; Sadeghian, Seed. 'How to Hide Circuits in MPC an Efficient Framework for Private Function Evaluation'. Advances in Cryptology—EUROCRYPT 2013. Lecture Notes in Computer Science Volume 7881, 2013, pp 557-574; Payman Mohassel, Saeed Sadeghian, and Nigel P. Smart. 'Actively Secure Private Function Evaluation'. IACR Cryptology ePrint Archive 2014: 102, 2014), which obtains actively secure PFE with $O(g*\log g)$ complexity, compared to $O(g^5)$ of universal circuits and $O(g*\log g)$ with a large implied constant for boolean circuits, where g is the circuit size.

Hardware-aware secure computation: further details of the application of hardware to speed-up and/or increase the security of the secure cryptographic calculation module using an accelerator module or a ciphering module, respectively, appear in the following publications (Järvinen, Kimmo; Kolesnikov, Vladimir; Sadeghi, Ahmad-Reza; Schneider, Thomas. 'Efficient Secure Two-Party Computation with Untrusted Hardware Tokens'. Information Security and Cryptography, pages 367-386, 2010; Tate, Stephen R; Vishwanathan, Roopa. 'General Secure Function Evaluation using standard trusted computing hardware'. Ninth Annual International Conference on Privacy, Security and Trust, pages 221-228, 2011), the contents of which are incorporated herein by way of reference.

Some of the previous secure schemes (e.g. homomorphic encryption) require that the same public/private keys be used between multiple client/users for encrypted data to be evaluated conjointly, that is, encrypted data cannot be produced under different public/private keys. To solve this shortcoming, various approaches can be considered. In one implementation, proxy re-encryption techniques are implemented (Blaze, Matt; Bleumer, Gerrit; Strauss, Martin. "Divertible protocols and atomic proxy cryptography". EUROCRYPT 1998, LNCS 1403, pages 127-144, 1998; Zheng, Qingji; Zhang, Xinwen; "Multiparty Cloud Computation". CoRR abs/1206.3717, 2012; Samanthula, Bharath K.; Howser, Gerry; Elmehdwi, Yousef; Madria, Sanjay. "An efficient and secure data sharing framework using homomorphic encryption in the cloud". Proceedings of the First International Workshop on Cloud Intelligence, Article No 8, 2012): these techniques allow the re-encryption under a new and more general proxy re-encryption key of the encrypted data which was previously encrypted under the key of just one user. In another implementation, secure distributed key generation techniques (Goldberg, Ian. "Distributed Key Generation in the Wild". Cryptology ePrint Archive 2012/377, July 2012) are used, which allow the creation of common public/private keys between a set of users/clients. In another implementation, multi-key fully homomorphic encryption is used to evaluate any circuit on encrypted data that might be encrypted under different public keys (Lopez-Alt, Adriana; Tromer, Eran; Vaikuntanathan, Vinod. "On-the-fly multiparty computation on the cloud via multi-key fully homomorphic encryption". Proceedings of the Symposium on Theory of Computing 2012, pages 1219-1234).

The secure cryptographic calculation module and/or the compiler of the secure parser module may be configured to determine whether the secure program is secure under a security model before executing it. For that purpose, statements of said secure program may be generated well-typed according to a type system extended with a secure type system provided with a plurality of typing rules describing security types that are assigned to one or more statements of the secure program, the process of verifying that said secure program is well-typed including data flow examination to determine that no type errors exist: execution of said well-typed secure programs are provably ensured to be secure under a security model, such as but not limited to, the malicious security model or the semi-honest security model, computational security model or unconditional security model, active or passive adversaries, static or adaptive adversaries. A compiled secure program may contain Typed Assembly Language to preserve typing information after compilation.

FIG. 3 illustrates a second exemplary execution flowchart of the system of the present disclosure, focused on its cryptographic aspects (this figure explains in more detail the steps 440-465 from FIG. 2). At 501, the cells, formulas, values and/or variables implied in the secure computation are identified from the spreadsheet interface, to serve as input to the generator of secure programs specified at 502:

in the first step of this module, at 503, a parser interprets the formulas of the spreadsheet application, which may exist in a proprietary or in a standardized format, and which may require extracting and interpreting more values, variables and/or formulas from the spreadsheet due to their nested nature. At 504, an optimizer may reposition and remove values, variables and the terms of the formulas to speed-up the secure computation according to the selected protocols and security models. At 505, the code emitter generates the code containing the secure programs equivalent to the formulas, values and/or variables from the spreadsheet, intended to be executed within the framework of the secure cryptographic calculation module and represented at 506: each user is assigned their own secure cryptographic calculation module, with the input values and/or variables encrypted depending on whether the protocol uses garbled circuits 507 (including oblivious transfers as is customarily implemented), secret sharing 508, homomorphic encryption 509 or oblivious random access machines 510. At 511, the secure program is sent to the secure cryptographic calculation module assigned to each user: this secure cryptographic calculation module contains methods, objects and other programming resources that will be used and invoked by the generated secure programs; that is, there are pre-installed libraries of objects and methods for carrying out secure computations using the described protocols and techniques such as, but not limited to, secret sharing (createShares( ), getCoefficients( ), interpolate( ), reconstructSecrets( ), openShares( ), sum( ), minus( ), multiply( ), divide( ), exp( ), log( ), homomorphic encryption (encrypt( ), decrypt( ), recrypt( ), genKeys( ), eval( )), garbled circuits (createCircuit( ), garbleCircuit( ), computeCircuit( ), getOutWires( ), setTableOfTranslations( ), verify( )), oblivious transfer (transfer( ), batchTransfer( ), getSigma( ), getX0( ), getX1( )), oblivious random access machines (createBlock( ), readyBlock( ), inputBlock( ), readBlock( ), outputBlock( ), condReadBlock( ), removeBlock( ), add( ), condAdd( ), pop( ), condpop( ), xor( ), init( ), flush( )). The generated secure programs use these methods and objects. During the execution of the secure programs at the secure cryptographic calculation modules 511, data will interchanged 513 as required by the secure computations protocols which are described in more detail below. Bi-directional secure communication channels 512 may be required (among others: Internet, a private network or a VPN).

Implementations of the present disclosure can be illustrated by way of examples. Improvements on the state of start of secure computation to enable the secure calculation of spreadsheets in a way sufficiently fast for the present disclosure to be practical and implemented in the secure cryptographic calculation module, are given below by way of examples:

In some examples, some fragments of the final optimized code do not include cryptographic operations, since it logically could be inferred that some calculations can be locally executed, thereby minimizing the number of secure interactions between the parties: accordingly, implementations of these optimizations can reduce the computational complexity of the un-optimized calculations (for example, from exponential or quadratic time, to constant time). More formally, for each spreadsheet formula or set of spreadsheet formulas a program P is generated, each party having his own set of inputs I and his result R for said program P: a party is said to be able to infer the value of an intermediate variable v in P, if said party is able to calculate said intermediate variable v from its inputs I and result R regardless the inputs of other participants. To infer said intermediate variable v in P, techniques from template-based program verification may be used to produce formulas that, when verified using a Satisfiability Module Theory (SMT) solver, establishes the party's knowledge of v and the actual formula to obtain said value using inputs I and result R. It is appreciated that the main advantage of these optimizations is that computations done locally could be of various orders of magnitude faster than any secure computation protocol, independent of the underlying cryptographic technique in use (homomorphic encryption, garbled circuits, oblivious transfers, secret sharing or ORAMs). Details of these optimizations can be found in (Florian Kerschbaum. 'Automatically Optimizing Secure Computation'. CCS '11 Proceedings of the 18th ACM Conference on Computer and Communications security, Pages 703-714; Florian Kerschbaum. 'Expression rewriting for optimizing secure computation'. CODASPY '13 Proceedings of the third ACM conference on Data and application security and privacy, Pages 49-58; Florian Kerschbaum. 'An information-flow type-system for mixed protocol secure computation'. ASIA CCS '13 Proceedings of the 8th ACM SIGSAC symposium on Information, computer and communications security, Pages 393-404; Rastogi, Aseem. Mardziel, Piotr. Hicks, Michael. Hammer, Matthew 'Knowledge Inference for Optimizing Secure Multi-party Computation'. Proceedings of the 8th ACM SIGPLAN Workshop on Programming Languages and Analysis for Security, Pages 3-14).

In some examples, the topological order of spreadsheet functions has already been computed and instructions for them have already been reordered to minimize their communication costs by reducing the number of execution rounds whenever securely computed, in such a way that a library of pre-cached secure spreadsheet functions is available by default before the secure spreadsheet functions are executed. Details for the described compiler optimization can be found in (Keller, Marcel; Scholl, Peter; Smart, Nigel. "An architecture for practical actively secure MPC with dishonest majority" Computer & Communications Security 2013, pp. 549-560). And noteworthy to the implementations of the present disclosure, it's the combination of some spreadsheet functions (particularly, linear algebra, statistical and financial methods) that have been optimized beyond what could be automatically achieved just by considering their execution in a sequential order, since algebraic simplification techniques have been applied to them before obtaining versions with reordered instructions that minimize their communication costs by analyzing their topological order: for example, "LOG(A1*A1*A1)+LOG(A1)" can be simplified to "4*LOG(A1)", and "EXP(A1) *EXP(2*A1)" can be simplified to "EXP(3*A1)".

In some examples, the secure implementation of the spreadsheet functions and formulas are extensively annotated in their source code to ease the choice of the best performing protocols and cryptographic primitives. Details of these execution optimizations can be found in (Schneider, Thomas; Schröpfer, Axel. "Automatic Protocol Selection in Secure Two-Party Computations", Applied Cryptography and Network Security, LNCS 8479, 2014, pp. 566-584), although it only considers garbled circuits or homomorphic encryption techniques in the two-party case, ignoring the better performance of secret sharing methods for secure computation, methods that are also used in the present disclosure. In some implementations of the present disclosure, spreadsheet functions may have implementations for better performance, in the form of specially conceived Secure Computation Protocols: for example, but not limited to the following, spreadsheet functions dealing with comparison and exponentiation functionality.

The implementations of the secure computation protocols of the present disclosure in the secure cryptographic calculation module obtain better performance than what could be achieved off-the-shelf by using previously technology, exploiting the rich structure provided by the functions of every spreadsheet formula, and by profiling in real-time their execution to find more optimizations. Implementations of the present disclosure can be illustrated by way of examples:

On the secure cryptographic calculation module, there are circuits for spreadsheet functions with better performance than those obtained by using generic compilations of the formulas from their source code definition: protocols using garbled circuits and private function evaluation directly benefit from these optimizations. By way of example, many financial formulas (ACCRINT—accrued interest for a security that pays periodic interest—, AMORLINC—depreciation for each accounting period—, DB—depreciation of an asset for a specified period—, NPV—net present value of an investment based on a series of periodic cash flows—, RATE—interest rate per period of an annuity—, YIELD—yield on a security that pays periodic interest—) and mathematical formulas (ABS—absolute value of a number—, CEILING—rounds a number to the nearest integer—, FACT—factorial of a number—, FLOOR—rounds a number down—, GCD—greatest common divisor—, INT—rounds a number down to the nearest integer—, LCM—least common multiple—, MDETERM—determinant of a matrix—, MMULT—matrix product of two arrays—, MOD—remainder from division—, POWER—number raised to a power—, PRODUCT—multiplies its arguments—, QUOTIENT—integer portion of a division—, ROUND—rounds a number to a specified number of digits—, SQRT—positive square root—, SUM—adds its arguments—, TRUNC—truncates a number to an integer—, among others) have pre-compiled circuits that feature special optimizations to make them much more faster.

During execution time, Somewhat Homomorphic Encryption schemes are preferred to fully homomorphic encryption schemes, that is, the costlier steps of homomorphic computation such as bootstrapping and re-encryption are avoided whenever possible. Also, knowing the details of the functions to be securely computed is of great advantage, redounding in a more efficient instantiation of the homomorphic schemes. By way of example, the growth of the noise produced by each formula can be precisely predicted even for the most complex spreadsheet functions, that is, the ones requiring the higher number of calculations (CORREL—correlation coefficient—, FORECAST—predict a future value by using linear regression—, LINEST—statistics for a line that best fists a dataset using the least squares method—, MULTINOMIAL—ratio of the factorial of a sum of values to the product of factorials—, SERIESSUM—sum of a power series—, SLOPE—slope of the linear regression—, SUMPRODUCT—sums of the products of the components of given arrays—) and the depth of the required circuits can be estimated before their execution.

Regarding ORAMs, some spreadsheet formulas show significant performance advantages when they are implemented using ORAMs. By way of example, the spreadsheet formulas VLOOKUP and MATCH are better implemented with ORAMs when doing binary searches over large sets of data rather than other methods of secure calculations, since amortized sub-linear costs per query can be achieved in these settings.

Regarding hardware modules and their application to secure/private function evaluation, such as an accelerator module and a ciphering module, the present disclosure may be used in combination with hardware modules (GPUs, FPGAs, ASICs, smartcards), as referenced in the description of the previous figure. By way of example, at least some spreadsheet functions can be efficiently pre-implemented in hardware modules to gain speed-ups in various orders of magnitude, particularly when using garbled circuits for secure multiparty computation.

The parameters of the system, cryptographic protocols and primitives are determined based on formulas as the ones cited in the following papers (Kleinjung, T.; Lenstra, Arjen. K.; Page, D.; Smart, Nigel P. "Using the Cloud to Determine Key Strengths". IACR Cryptology ePrint Archive, 2011: 254, 2011; Lenstra, Arjen. K.; Verheul, Eric R. "Selecting Cryptographic Key Sizes". Proceedings of PKC 2000, Lecture Notes in Computer Science Volume 1751, pp. 446-465) and current recommendations and best practices (Smart, Nigel P.; Rijmen, Vicent; Warinschi, Bogdan; Watson, Gaven. "Algorithms, Key Sizes and Parameters Report". Technical Report of the European Union Agency for Network and Information Security Agency, 2013; Smart, Nigel P. et al. "ECRYPT II Yearly Report on Algorithms and Keysizes (2011-2012)"). The system may automatically change these parameters to trade security for performance, and users of the system may override these parameters for ones of their choice.

FIG. 4 illustrates secure spreadsheet calculation system 100 as further discussed herein and in accordance with the present disclosure. The system 100 comprises a cloud computing system 104 where parties 102 may outsource secure computations as detailed on the spreadsheet modules 101: for each party 102 a separated server 105 is made available on the cloud computing system 104 (preventing that a malicious party could impact the computations of other parties in case of multiple parties used the same server) and securely interconnected by communication channels 106 (an internal network of the cloud computing system). The system 100 also comprises a protocol component 103 of the secure parser module which the parties 102 use to send encrypted values, variables and/or formulas to the servers 105 through communication channels (among others: Internet, a private network or a VPN), so that the cloud computing system 104 is unable to decrypt them but they still can be used as inputs to execute a secure computation through communication channels 106. The protocol component 103 and the executed secure computation computation using the secure cryptographic calculation module, combines multiple secure cryptographic technologies (as described in more detail in the exemplary flowcharts of FIG. 2 and FIG. 3) offering different security models as chosen by the users (computational vs unconditional security; active vs passive adversaries; static vs adaptive adversaries; malicious vs semi-honest security model; commodity or trusted hardware; among others) to carry out the secure computations. After the secure computation has ended, the servers 105 at the cloud computing system 104 send the encrypted results as calculated according to the secure computation described by the formulas, using protocol component 107 of the secure parser module to the parties 102 through communication channels (among others: Internet, a private network or a VPN), so that only the receiving parties are able to decrypt the outputs to show them on the spreadsheets 101.

Exemplarily, parties 102 may provide their secret data in the form of secret shares and then go temporarily offline while servers 105 securely compute the encrypted results: that is, servers 105 act as computational parties, securely computing the outsourced calculations from parties 102. In said exemplary setting, a number of servers 105 less than the number of parties 102 may be used.

FIG. 5 illustrates secure spreadsheet calculation system 200 as further discussed herein and in accordance with the present disclosure. The system 200 comprises different cloud computing systems 204 where parties 202 may outsource secure computations as detailed on the spreadsheet modules 201: for each party 202 a separated server 205 is made available on anyone of a set of different cloud computing system 204, securely interconnected by communication channels 206 (among others: Internet, a private network or a VPN). The purpose of using different cloud computing systems 204 is to provide higher levels of resiliency and security to the parties 202, by preventing the threat of an attacker controlling one cloud computing system. The system 200 also comprises a protocol component 203 from the secure parser module which the parties 202 use to send encrypted values, variables and/or formulas to the servers 205 through communication channels (among others: Internet, a private network or a VPN), so that the cloud computing systems 204 are unable to decrypt them but they still can be used as inputs to execute a secure computation through secure communication channels 206. Analogously to FIG. 4, secure computations are carried out using the secure cryptographic calculation module as described in more detail in the exemplary flowcharts of FIG. 2 and FIG. 3. After the secure computation has ended, the servers 205 at the cloud computing systems 204 send the encrypted outputs resulting from the computation described by the formulas, using protocol component 207 of the secure parser modules to the parties 202 through communication channels (among others: Internet, a private network or a VPN), so that only the receiving parties are able to decrypt the outputs to show them on the spreadsheets 201.

Exemplarily, parties 202 may provide their secret data in the form of secret shares and then go temporarily offline while servers 205 securely compute the encrypted results: that is, servers 205 act as computational parties, securely computing the outsourced calculations from parties 202. In said exemplary setting, a number of servers 205 less than the number of parties 202 may be used.

FIG. 6 illustrates secure spreadsheet calculation system 300 as further discussed herein and in accordance with the present disclosure. The system 300 does not outsource the secure computation to cloud computing systems (that is, the secure parser module and the secure cryptographic calculation module reside in the same computing device) because the actual execution of the secure computation is performed by using the own computers of the parties 302: each party 302 is interconnected with the others through secure communication channels 308 (SSL or VPN, over LAN connections), and the same secure protocol components of the secure parser module previously described in FIG. 4 and FIG. 5 are used to send and receive encrypted values, variables and/or formulas. The purpose of not outsourcing the secure computation to cloud computing systems is to offer a higher level of security in case of mistrusting external cloud computing systems, even if this means lowering performance. Optionally, a component 309 may be available in the network to speed-up and secure the computations between the parties 302, as a hardware extension to the secure cryptographic calculation module as disclosed herein. The protocol components of the secure parser module and the executed secure computations using the secure cryptographic calculation module are analogous to those of FIG. 4 (as described in more detail in the exemplary flowcharts of FIG. 2 and FIG. 3). After the secure computation has ended, the results of the computation described by the formulas are still encrypted, so that each corresponding party 302 is the only able to decrypt these outputs to show them on the spreadsheet modules 301.

FIG. 7 is a first exemplary GUI diagram 700 illustrating at a very high level manner how the present disclosure works in conjunction with a spreadsheet program 701 that support "add-ins", such as Microsoft® Excel®, or in a custom program for these secure calculations. The user interface is described herein only in so far as is necessary for an understanding of the present disclosure. Generally speaking, when some pre-determined colors are used to mark a cell containing a formula 705 or a value 706, or when a pre-determined commentary is used to mark a cell containing a formula 704 or a value 707, or the contents of the cell are contained within expressions such as "[ ]" and "=SC( . . . )", then they are to be interpreted as cells to be directly processed by the secure spreadsheet calculation system, in direct contrast to cells not implicitly marked to be securely computed 708. The button "Execute NOW" 702 is clicked by the user to start the secure computation, and the button "SCHEDULE" is clicked to trigger the execution of the secure computation at some time in the future. Whatever the method of invocation, the parser module of the secure spreadsheet calculation system obtains values and formulas from the spreadsheet to generate secure programs implementing secure computation protocols equivalent to the formulas and values contained within the spreadsheet, the secure cryptographic calculation module computing encrypted user spreadsheet results by executing said secure programs, and the secure parser module decrypting them and updating cells with the calculated results (note that resulting values could appear within the cells themselves, or in adjacent cells, or in other cells specified by the user).

FIG. 8 is a second exemplary GUI diagram 800 illustrating in a very high level manner how the Formula Rewrite Assistant 801 operates: the purpose of this Assistant is to rewrite problematic formulas, remove their ambiguities and/or propose better representations of the formulas than can be securely calculated faster by the cryptographic protocols previously described in FIG. 2 and FIG. 3. The user interface is described herein only in so far as is necessary for an understanding of the present disclosure. The input formula 802 from a spreadsheet as described in FIG. 7 is rewritten to an output formula 803 depending on the checks selected by the user: for example, whether the formula should be rewritten to optimize execution 804; a check for collapsing the terms of formulas 805; another check to re-arrange optimizations 806; or another check to aggregate functions 807. Additional messages may appear explaining the concrete meaning of each check and the proposed rewritten formula.

Finally, the user may accept or discard the proposed changes using the corresponding "Accept"/"Cancel" buttons 808.

FIG. 9. illustrates an exemplary computer system 900 as further discussed herein and in accordance with the present disclosure. The system is described herein only in so far as is necessary for an understanding of the present disclosure. The system 900 can be used for the operations described in association with the detailed descriptions, implementations and examples described herein. For example, the system 900 may be included in any or all of the server components 901, 902 and 903 discussed herein; these components incorporate a Central Processing Unit 904, a memory 905, a network device 906, a storage device 907 and a display 908: each of the components 904, 905, 906, 907 and 908 are interconnected using a system bus 909.

The Central Processing Unit 904 executes instructions within the server components 901, 902 and 903 discussed herein. In one implementation, the Central Processing Unit 904 is a single-core and single-threaded Central Processing Unit. In another implementation, the Central Processing Unit 904 is a multi-core and multi-threaded Central Processing Unit. The Central Processing Unit 904 executes instructions stored in the memory 905 or in the storage device 907, processing data in the memory 905 or in the storage device 907, data which may be transmitted over a network device 906 or which may be displayed graphically in a user interface on a display 908.

The memory 905 serves as an information store for system 900. In one implementation, the memory 905 is a computer-readable medium. In another implementation, the memory 905 is a volatile memory unit. In another implementation, the memory 905 is a non-volatile memory unit.

The network device 906 is capable of transmitting information to and from other computer systems 900 or any other computer systems. In one implementation, the network device 906 transmits information over fiber optic cables. In another implementation, the network device 906 transmits information over copper cables. In another implementation, the network device 906 transmits information over microwaves. In any or all of the previous implementations, the network device 906 may directly access the memory 905 and the Central Processing Unit 904 may directly access the network device 906.

The storage device 907 is capable of storing big amounts of data for the system 900. In one implementation, the storage device 907 is a computer-readable medium. In various different implementations, the storage device 907 may be a hard disk device, a floppy disk device, an optical disk device, a tape device, a Network-Attached Storage device, a Storage-Area Network device or a Cloud Storage device.

The display device 908 is capable of displaying processed data in a user interface. In one implementation, the display device 908 is a cathode ray tube monitor. In another implementation, the display device 908 is a liquid crystal display monitor. In another implementation, the display device 908 is a thin-film transistor monitor. In another implementation, the display device 908 is made from organic light-emitting diodes.

The features can be implemented in digital electronic circuitry, or in computer hardware, firmware, software, or in a combinations of them. The features, and the apparatus, can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (Application-Specific Integrated Circuits) or FPGAs (Field-Programmable Gate Arrays) or GPUs (Graphics Processing Units).

To provide for interaction with a user, the features can be implemented on a computer having a display device such as CRT (Cathode Ray Tube) or LCD (Liquid Crystal Device) or TFT (Thin-Film Transistor) or OLED (Organic Light-Emitting Diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a RDMA-enabled connection, a WAN, and the computers and the networks forming the Internet. Those skilled in the art will appreciate that computer systems have a variety of configurations and protocols that can be used to communicate data, and thus, no particular configuration or protocol is considered limiting.

The computer system can include clients and servers. A client and server are generally remote from each other and typically interact through a network. The relationship of client and server arise by virtue of computer programs running on the respective computers and having a client-server relationship to each other.

Moreover, the logic flows depicted in the figures do not require the particular order shown, or sequential order, to achieve the desirable results. In addition, other steps may be provided, or steps may be eliminated, from the described flows, and other components may be added to, or removed from, the described systems. Accordingly, other implementations are within the scope of the following claims.

The present disclosure has been illustrated and described in detail in the drawings and the foregoing description. Such illustration and description are to be considered illustrative or exemplary and nor restrictive; the present disclosure is not limited to the disclosed embodiments. Descriptions of additional claimed embodiments follow:

To further protect spreadsheets, additional features beyond secure computation are offered for signing, time-stamping and indexing spreadsheets. These features are of special usefulness whenever a spreadsheet is adapted for secure computation, since it may be necessary to share it with other users before starting a joint secure computation: to guarantee full security, it's crucial that file distribution is kept secure from Man-In-The-Middle attacks and other computer attacks, thus the need to certify that a spreadsheet really comes from a particular user. To fulfil these objectives, the present disclosure further comprises: a digital time-stamping module, to securely keep track of the creation and modification of spreadsheets, said module executing at least one implementation of a standard trusted time-stamping technologies such as RFC 3161 (Internet X.509 Public Key Infrastructure Time-Stamp Protocol) and the ANSI ASC X9.95 Standard for Trusted Time-stamps; a digital signing module, to guarantee the integrity, non-repudiation and authentication of spreadsheets files, said module executing at least one implementation of standard signing technologies such as RSA-PSS and ECDSA; and a indexer module for accessing to a public registry of spreadsheet files, to facilitate the interchange of secure spreadsheets between users, said module executing at least one implementation of standard protocols such as SFTP, WebDAV and CMIS.

Further to providing a secure re-implementation of spreadsheet functions from spreadsheet commercial packages available in the market, the present disclosure leaves open the possibility of extending said set of spreadsheet functions. In particular, and given the financial applications of the present disclosure, the following set of provided functions are of upmost utility: the function SEC_SEARCH( ), providing secure search over secret datasets; the function SEC_INDEX( ), providing access to secure indexes for updating and searching purposes; the function SEC_EXCHANGE( ), providing access to secure exchanges to trade financial instruments such as securities, commodities, currencies, futures and options using secret parameters such as, but not limited to: price, quantity and expiration dates; the function SEC_AUCTION( ), providing access to secure auctions using secret parameters such as, but not limited to: bidding price, reserve price, quantity and lot composition; the function SEC_SETTLEMENT( ), providing secure settlement of securities; the function SEC_CLEARHOUSE( ), providing secure clearing services between users; the function SEC_TRANSACTION( ), providing secure transactions between users; the function SEC_MATCHMARKETS( ), providing secure matching markets; the function SEC_COMBOPT( ), providing secure combinatorial optimizations such as, but not limited to, integer programming, linear programming and simplex optimization; and combinations thereof.

A number of implementations of the present disclosure have been described. Although the subject matter has been described in language specific to the structural features and/or methodological acts, it is to be understood that the subject matter defined in the appended claims is not necessarily limited to the specific features or acts described above, and that various modifications may be made without departing from the spirit and scope of the present disclosure. Rather, the specific features or acts described above are disclosed as example forms of implementing the claims, and other implementations are within the scope of the following claims.

I have therefore described an implementation of a practical secure spreadsheet system, which makes the techniques from the field of Secure Multi-Party Computation accessible to users with no previous knowledge of cryptography and with little to none modifications to their existing spreadsheets. The system is also ready to work on cloud computing systems, securely outsourcing complex calculations of high economic value to remote servers.

The invention claimed is:

1. A user programmable secure spreadsheet calculation system, comprising:
   a spreadsheet module configured to process user data in one or more spreadsheet files, said user data comprising user values, user variables and/or user formulas, user variables and/or user formulas,
   a secure parser module configured to
      obtain said user data from said spreadsheet module and to
      generate a retro-compatible secure program with at least one secure computation protocol using the obtained user data so as to allow secure computation of a least one encrypted retro-compatible user spreadsheet result, and
   a secure cryptographic calculation module configured to
      receive said retro-compatible secure program from said secure parser module, and to
      securely compute said at least one encrypted retro-compatible user spreadsheet result by executing said retro-compatible secure program.

2. The system according to claim 1, wherein said secure cryptographic calculation module is additionally configured to transmit the at least one encrypted retro-compatible user spreadsheet result to said secure parser module and said secure parser module is additionally configured to decrypt the received at least one encrypted retro-compatible user spreadsheet result and to provide said decrypted retro-compatible user spreadsheet result to said spreadsheet module.

3. The system according to claim 1, wherein the spreadsheet module and the secure parser module are comprised in a local computing device and the secure cryptographic calculation module is comprised in a remote computing device, connected with said local computing device.

4. The system according to claim 1, wherein said secure computation protocol comprises at least one privacy-preserving protocol from a group of privacy-preserving protocols consisting of: garbled circuits and oblivious transfers, secret sharing, homomorphic encryption, oblivious random access machines (ORAM), and combinations thereof.

5. The system according to claim 1, wherein said secure cryptographic calculation module is further configured to obtain third-party values, variables and/or formulas from a directory of encrypted retro-compatible third-party values, variables and/or formulas and said secure cryptographic calculation module is configured to securely compute the at least one encrypted retro-compatible user spreadsheet result by executing the retro-compatible secure program using said third-party values, variables and/or formulas.

6. The system according to claim 1, wherein said secure cryptographic calculation module is configured for retro-compatible secure function evaluations or for retro-compatible private function evaluations.

7. The system according to claim 1, wherein the spreadsheet module is further configured to process said one or more spreadsheet files by at least one of following: a digital time-stamping module; and a digital signing module; and an indexer module of a public registry of spreadsheet files; and combinations thereof.

8. The system according to claim 1, further comprising: a catalogue module of secure functions configured to obtain retro-compatible secure programs associated with functions that are configured to generate results based on one or more user data associated with at least one of or more of a secure searcher; a secure indexer; a secure exchange; a secure auction; a secure settlement system; a secure clearing house; a secure transaction system; a secure matching market; a secure combinatorial optimizer; and combinations thereof.

9. The system according to claim 1, further comprising: a key generation and distribution module, for generating at least one set of public and private keys and distributing said keys to at least one of the modules of the system.

10. The system according to claim 1, further comprising: an accelerator module to speed-up the secure cryptographic calculation module; and a ciphering module to increase the security of the secure cryptographic calculation module.

11. The system according to claim 1, further comprising: an interactive assistant module to suggest re-arrangements of the formulas to the user.

12. The system according to claim 1, wherein said secure parser module is furthermore configured to interpret multi-dimensional expression languages and data analysis expressions.

13. A non-transitory computer-readable storage medium including contents stored thereon which, when executed by the one or more computers, cause the one or more computers to perform secure spreadsheet calculations, comprising:
acquiring user data from a spreadsheet module; and
parsing to interpret said acquired user data; and generating a retro-compatible secure program with at least one secure computation protocol using the acquired user data so as to allow secure computation of at least one encrypted retro-compatible user spreadsheet result; and
transmitting said retro-compatible secure program; and
receiving said retro-compatible secure program; and securely computing said at least one encrypted retro-compatible user spreadsheet result by executing said retro-compatible secure program.

14. A computer implemented method of secure spreadsheet calculation, comprising:
acquiring user data from a spreadsheet module; and
parsing to interpret said acquired user data; and generating a retro-compatible secure program with at least one secure computation protocol using the acquired user data so as to allow secure computation of at least one encrypted retro-compatible user spreadsheet result; and
transmitting said retro-compatible secure program; and
receiving said retro-compatible secure program; and securely computing said at least one encrypted retro-compatible floating user spreadsheet result by executing said retro-compatible secure program.

* * * * *